A. H. BOETTCHER.
PILOT DIRECTING INSTRUMENT AND BOMB DROPPING SIGHT FOR AIRCRAFT.
APPLICATION FILED NOV. 18, 1918.

1,381,396.

Patented June 14, 1921.

UNITED STATES PATENT OFFICE.

ARTHUR H. BOETTCHER, OF CHICAGO, ILLINOIS.

PILOT-DIRECTING INSTRUMENT AND BOMB-DROPPING SIGHT FOR AIRCRAFT.

1,381,396. Specification of Letters Patent. Patented June 14, 1921.

Application filed November 18, 1918. Serial No. 263,102.

*To all whom it may concern:*

Be it known that I, ARTHUR H. BOETTCHER, a citizen of the United States, residing at Chicago, Illinois, have invented new and useful Improvements in Pilot-Directing Instruments and Bomb-Dropping Sights for Aircraft, of which the following is a specification.

This invention relates to bomb dropping sights adapted to be carried by aircraft, and contemplates an improved arrangement whereby an observer in the bow of such craft may convey information to the pilot, whose view of the target may be more or less obstructed, in order to enable the pilot more efficiently to maneuver the aircraft with respect to the target for securing a hit on the release of the bomb.

The purposes of the sight are:

(a) To direct the pilot toward the target, so that the trajectory of the released bomb will, so far as possible, lie in a vertical plane intersecting the target; and (b) To determine the "dropping angle", or instant at which the bomb must be released.

It is found by experience that the most efficient type of bombing aircraft are those in which the observer's cockpit is in the bow, with the pilot's cabin in the waist of the body. Since the pilot from his position cannot see the target, at least while he is approaching and nearing it, it is impractical for him to perform the bombing function. Moreover, experience has shown that the bombing operation is most accurately executed when left to the observer, who is relieved of other duties for the time being, while the pilot merely manipulates the craft, provided that means for the efficient coöperation of the two are provided. The practice, therefore, in aircraft of this type, is for the observer to perform the function of bombing from his position in the forward cock-pit, from which he has full vision and can readily sight the target.

It is the purpose of the present invention to enable the observer, as part of his duty, to direct the pilot automatically and continually so that the initial velocity imparted to the bomb by the movement of the craft relative to the earth, will have proper direction toward the target. The other factor is the "dropping angle", which, since the trajectory is a modified parabola, is primarily dependent upon the speed of the aircraft over ground, and its altitude, the former determining the amount of the initial velocity, and the latter the point of intersection of the surface of the earth by the trajectory.

It is important that by means of the present invention the target may be approached from any direction relative to the wind; in other words, drifting or not drifting, and the pilot, in following the guidance of the observer, may dismiss the matter of drift from his mind, following the same tactics regardless of the direction or velocity of the wind.

To enable others skilled in the art so fully to comprehend the underlying features of the invention that they may embody the same into the numerous modifications in structure and relation contemplated by this invention, drawings depicting a preferred form have been annexed as a part of this disclosure, and in such drawings like characters of reference denote corresponding parts throughout all the views, of which:

Figures 1, 9, 10:
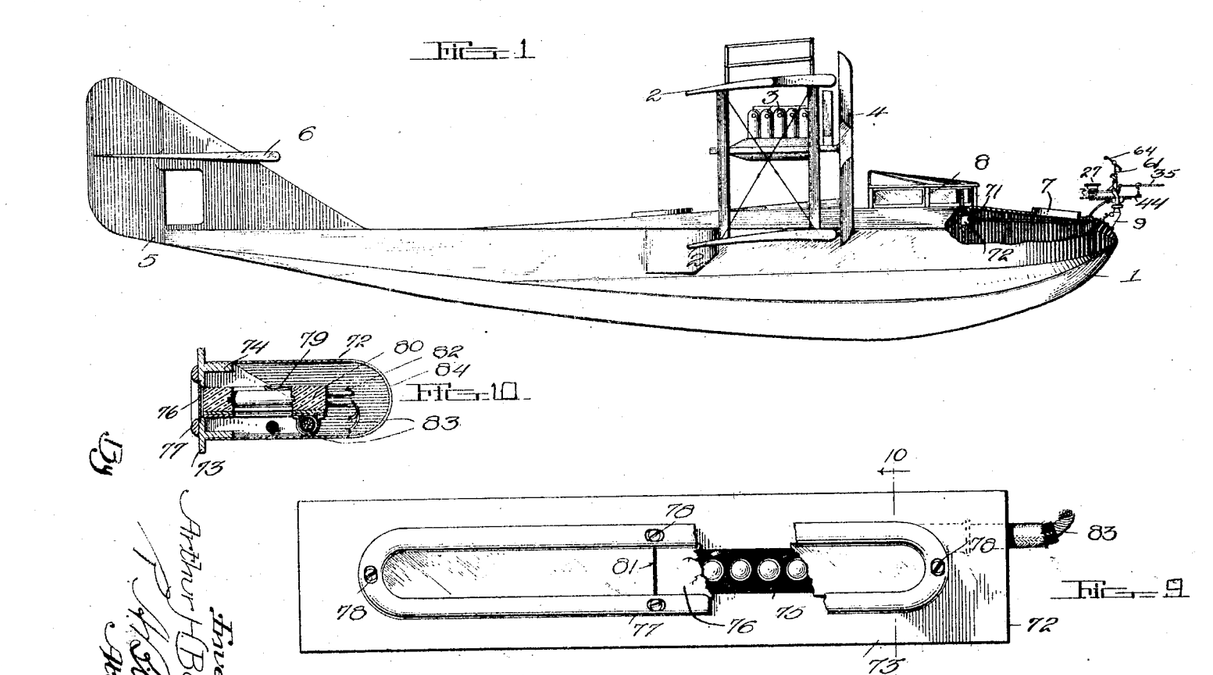
Figure 1 is an elevational view of a flying boat with the device of my invention mounted thereon, part of the hull being broken away to illustrate interior arrangement.
Fig. 9 is a front elevational view of the pilot's device.
Fig. 10 is a sectional view taken on the plane of the line 10—10 of Fig. 9 and looking in the direction indicated by the arrows.

Referring first to Fig. 1, it will be seen that there is illustrated a flying boat, the hull of which is shown at 1, the wings at 2, 2, the engine at 3, the propeller at 4, the rudder at 5, and the flipper at 6. In the bow of the boat the observer's cockpit 7 is provided, the pilot's cabin 8 being located in the waist.

The observer's instrument is mounted on the bow directly in front of the observer's cockpit as shown. This mounting is by means of a bow bracket 9, illustrated in detail in Figs. 2 and 4.

Figure 2:
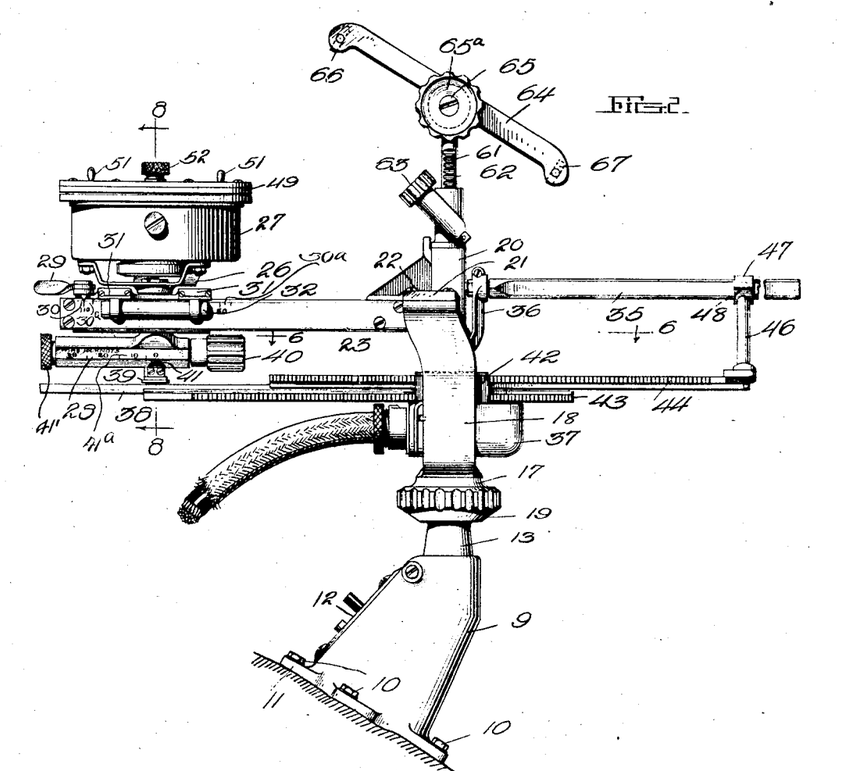
Fig. 2 is a side elevational view of the sight *per se*, that is, the observer's instrument.
Figures 4, 5:
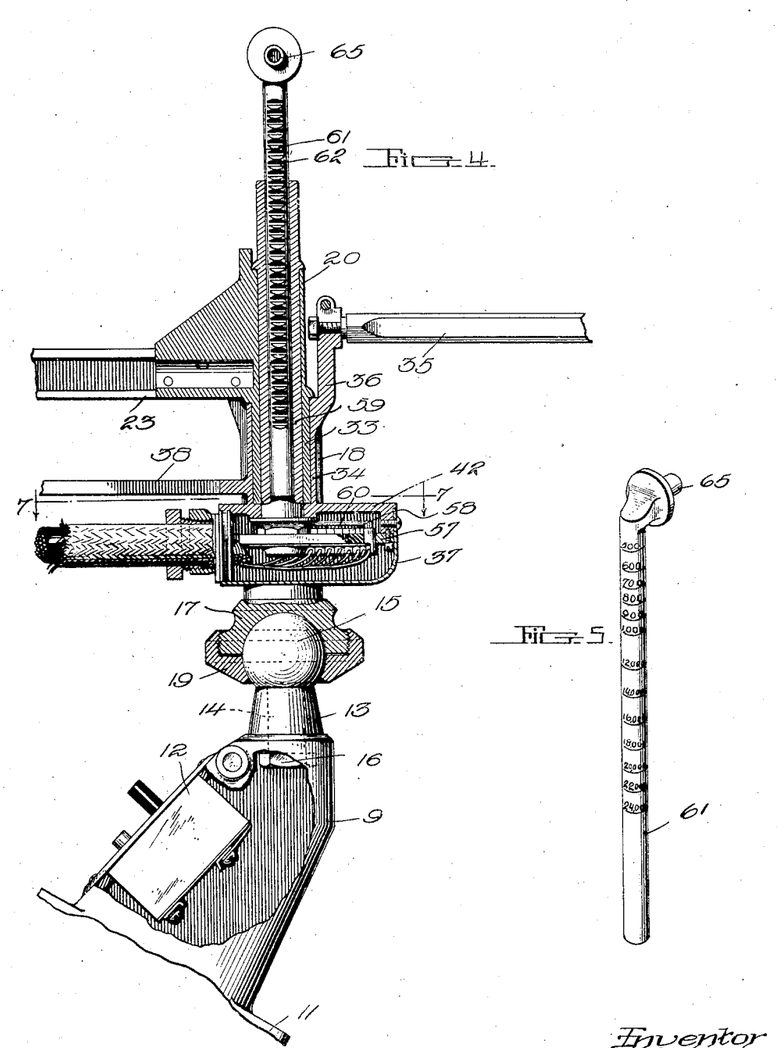
Fig. 4 is a partial vertical sectional view on the plane of the line 4—4 of Fig. 3, and looking in the direction indicated by the arrows.
Fig. 5 is a perspective view of the altitude bar.

Referring now more particularly to these two figures, it will be seen that the bow bracket 9 may be secured to the bow by means of bolts, 10, 10, passing through the base lugs 11, 11. This bow bracket is hollow and the electric switch 12, which will be referred to further later, is mounted therein. The bow bracket terminates at the top in a tubular portion 13, which receives a stem 14 of a ball 15 of a ball and socket joint. This stem 14 is clamped in place by means of a nut 16 on the inside of the bracket. The socket of the ball and socket joint is formed by the base 17 of a yoke 18 and a ball nut 19 which screws on the base and may be tightened to form a proper friction hold within the ball and socket joint, permitting a limited universal adjustment.

At the top of the yoke 18, a sleeve 20 is secured through the intervention of the base 21 and screws 22, 22. Also secured to this base and extending rearwardly therefrom is the so-called "air bar" 23. This air bar must be mounted parallel to the keel of the boat or center line of the body, and adjustment for this purpose may be effected by the angular adjustment of the stem 14 in the tubular portion 13 of the bow bracket 9. It will be seen from Fig. 8 that the air bar comprises two channel members in which the compass carrier 24 is mounted for longitudinal adjustment. Mounted in the carrier 24 is a rotatable shaft 25 which, by way of a bracket 26, at its top, carries a compass 27, the details of which will be referred to hereinafter.

Secured to the bottom of the shaft 25 is the so-called "wind bar" 28, which is in the nature of a crank rotating about the axis of the compass. This will be referred to in detail later. It will be seen that the compass may be moved back and forth longitudinally on the air bar, which is calibrated for "air speed," in this instance from 55 to 110 knots. A clamp 29 is provided for the purpose of clamping the carrier 24 in any adjusted position, in accordance with the setting of the indicator point 30 relative to this air speed scale 30$^a$. Mounted with the compass carrier 24 are the receptacles 31, 31, and 32, 32, for the reception of magnets for correcting the compass.

Figure 14:
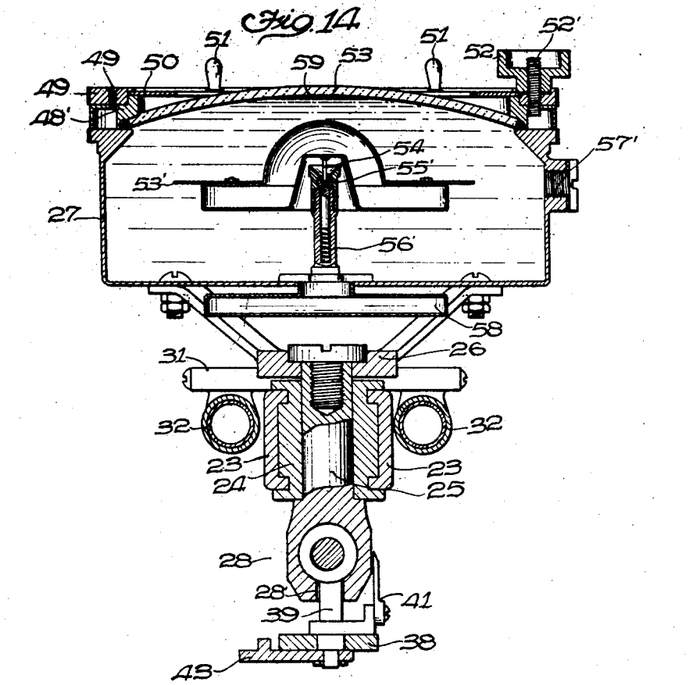
Fig. 14 is an enlarged vertical sectional view through the compass and wind bar adjusting device.
Figure 15:
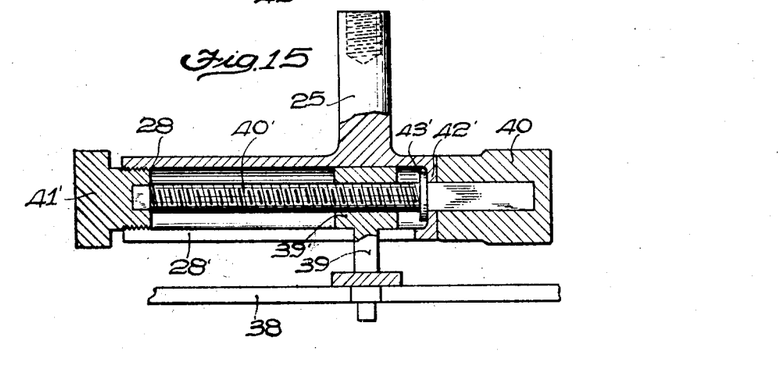
Fig. 15 is a longitudinal sectional view through the wind-bar adjustment.

Referring now particularly to Figs. 2 and 4, it will be seen that the base 21, which is mounted upon the yoke 18, has the downwardly extending sleeve 33, upon which the carrier tube 34 is mounted for angular motion about its own axis. This carrier tube 34 carries forwardly the so-called "ground speed bar" 35 by way of a bracket 36, the commutator casing 37, and the rearwardly extending slotted bar 38. The slotted bar 38 receives a pivot member 39 which is carried adjustably in the wind bar 28, the adjustment of this pivot member being effected by a hand screw 40. This adjustment is illustrated in Figs. 14 and 15, from which it will be noted that the wind-bar 28 is tubular in construction for receiving therein a longitudinal lead screw 40' of relatively sharp pitch. One end of this lead screw 40' is journaled in an end cap 41' and the other end is journaled in an internal flange 42', a collar 43' preventing endwise motion. The pivot member 39 extends up through a longitudinal slot 28' in the bottom of the wind-bar 28, and is formed with a threaded head or nut 39' screwing over the lead screw 40'. Turning the hand screw 40 in one direction or the other moves the pivot member 39 back and forth in the wind bar, which is calibrated in knots for wind velocity, as illustrated in Fig. 2, the pivot member 39 carrying an indicator point 41 for coöperation with the wind velocity scale 41$^a$. As shown in Fig. 2, this indicator point is set at zero, a no-wind condition.

Figure 6:
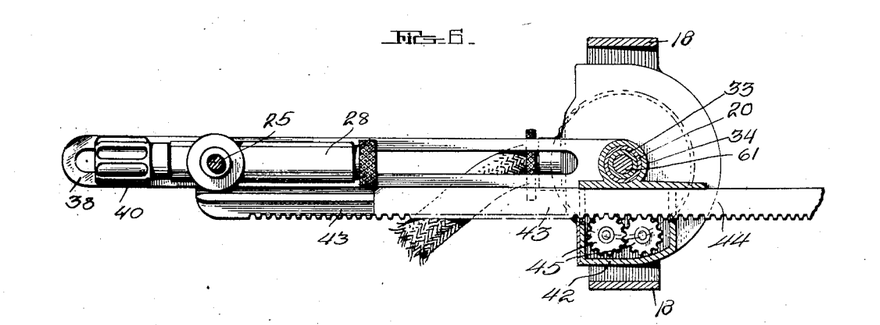
Fig. 6 is a horizontal partial sectional view taken on the plane of the line 6—6 of Fig. 2, and looking in the direction indicated by the arrows.

Mounted on the top of the commutator casing 37 is an auxiliary casing 42 in which two racks 43 and 44 are mounted, one above the other, for longitudinal movement. Rack 43 extends rearwardly and, as particularly shown in Figs. 2 and 6 has an opening at its rear end for the reception of the lower end of the pivot member 39. Movement back and forth of this rack 43 is transmitted to the forwardly extending rack 44 through the intervention of a gear and pinion set 45 suitably journaled in the auxiliary casing 42, the arrangement being such that as the rear rack is moved forwardly, the forward rack is moved rearwardly the same amount, and vice versa.

The forward rack 44 carries at its forward end the upwardly extending stem 46 which, in turn, carries the bead member 47. This bead member has an opening therethrough and the ground speed bar 35 extends through this opening. In other words, the bead member rides on the ground speed bar. The bead member carries the bead 48. This bead is the front sight. The ground speed bar 35 may be calibrated in ground speed as will be described later.

It will now be seen that when the pivot member 39 is not coincident with the axis of the shaft 25, rotation of the compass will result in the swinging of the bar 38 from side to side and in the movement back and forth of the rack 43. This movement from side to side is transmitted through the tubular carrier 34 and the bracket 36 to the ground speed bar 35 which is always maintained, thus, exactly parallel to the bar 38. At the same time the back and forth movement is transmitted to the bead 48 through the rack and pinion mechanism and the stem 46, the result being that the circular movement of the pivot 39 about the axis of the shaft 25 produces a similar circular movement of the bead 48.

As shown in Fig. 14, the top of the compass is closed by a crystal 53 which is secured in place upon the compass casing by a flanged ring 48'. Mounted for rotation on the flanged ring 48' is an indicating ring 50, which is retained upon the lower ring 48' by a flanged retaining ring 49. The rings 48' and 49 are fastened together by screws 49', the flanges on these rings being properly spaced to permit free rotation of the indicating ring 50 by means of the pins 51, 51. The ring 50 is adapted to be clamped in any desired angular position by a clamping screw 52, which is arranged to thread down over a screw 52' so that the hub of the clamping member 52 can engage and lock the ring 50. The compass element 53' may be of any conventional construction, such as the disk or card shown, which may either be magnetized itself or may support a suitable magnet. The card is mounted through a pintle or needlelike bearing 54' which bears in a jewel bearing 55' resiliently supported in an obvious manner upon a spring 56'. The compass is a so-called "liquid" compass, that is, the card is suspended in liquid, and is visible through the crystal 53 secured in place upon the compass casing. The casing is adapted to be filled through a screw closed filler opening 57', and an expansion chamber 58' is provided for taking care of thermal expansion of the liquid. The crystal of this compass is preferably made convex, and an air bubble 59' is provided within the casing so that the compass may be used simultaneously as a compass and as a level. A so-called "wind arrow" 54 is painted or otherwise marked on the crystal in a position later explained. The north indicating arrow 55 is provided on the card and the indicating point 56 is marked on the ring 50, the purpose of this arrangement will be described when the operation of the device is explained.

Figures 7, 8:
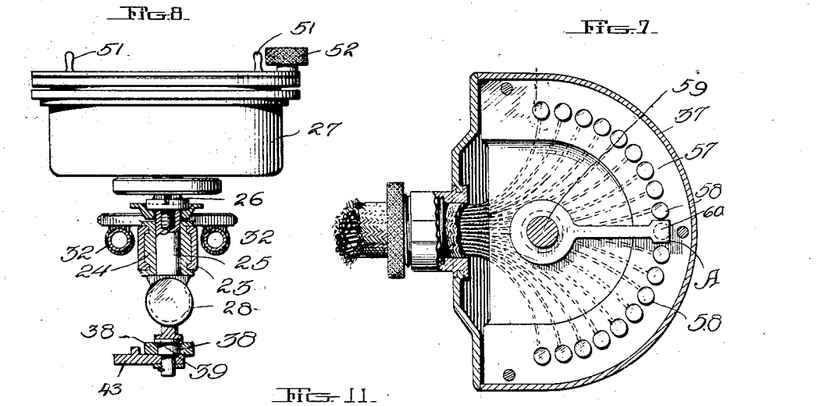
Fig. 7 is a partial sectional view taken on the plane of the line 7—7 of Fig. 4, and looking in the direction indicated by the arrows.
Fig. 8 is a partial sectional view taken on the plane of the line 8—8 of Fig. 2, looking in the direction indicated by the arrows.

Inside the commutator casing 37 a general semi-circular insulating piece 57 is secured, as illustrated in Figs. 4 and 7. Mounted in this insulating piece is a series of 19 contacts, 58, 58, spread over 180° and the center contact occupying exactly the center position. Mounted in the downwardly extending sleeve 33 is an inner sleeve 59 which is capable of angular motion through 180 degrees, and this sleeve carries at its bottom a contact brush 60 which rides over the contacts 58, 58. Mounted within the inner sleeve 59 is the altitude bar 61, which is adjustable up and down by means of a rack 62 cut thereon and a pinion (not shown) operated by the hand screw 63. The altitude bar is calibrated in height in feet as illustrated in Fig. 5 and is keyed to the inner sleeve 59 so that it is capable of vertical adjustment therein but must move angularly therewith about the axis upon which the ground speed bar swings. At the top of the altitude bar 61, the target following sight bar 64 is pivoted on the horizontal axis 65, this sight bar having a rear ring sight 66 and a front ring sight 67 in which vertical cross hairs 68 and 69 and a horizontal cross hair 70 are provided. It will be seen now that the target following sight bar 64 has universal movement, its movement in azimuth being transmitted through the altitude bar 61 and inner sleeve 59 to the brush 60. The bar is actuated by means of a handle 65ᵃ. The relation of the parts is such that when the sight bar is parallel to the ground speed bar 35, the brush 60 will lie on the center contact 58 which is indicated specially by the letter "A". Since the contact 58 and the insulating piece 57 which comprise the commutator, are mounted rigidly in the casing 37, and since the casing 37 is mounted rigidly with reference to the ground speed bar, 35, it is clear that whatever be the assumed position of the ground speed bar, the center contact A will be engaged by the brush when the target following sight bar 64 is parallel to the ground speed bar 35. The importance of this point will appear presently.

Figure 11:
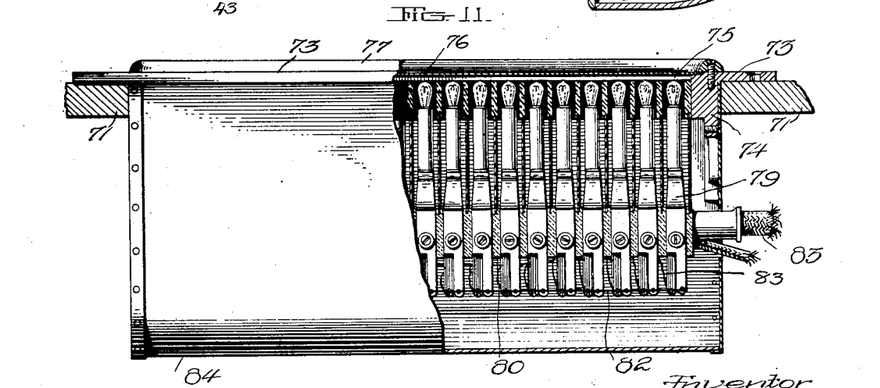
Fig. 11 is a plan view of the pilot's device, part of the casing being broken away to reveal the interior construction.

In Fig. 1 the pilot's instrument board is indicated at 71 and the pilot's instrument, indicated as a whole by the reference character 72, is mounted in the instrument board before the eye of the pilot. The pilot's device is illustrated particularly in Figs. 9, 10, and 11. The casing comprises an escutcheon plate 73, which is mounted upon the instrument board and which has a frame 74 integral therewith and extending through an opening in the instrument board as shown so that the escutcheon plate may be flush upon the board and the mechanism of the pilot's device in back of the board. The escutcheon plate has an elongated opening 75 which is covered by translucent material, such as celluloid, 76, held in place by a rim 77, secured in place by the screws 78, 78. The frame 74 mounts nineteen incandescent lamps set in horizontal series and preferably equidistantly spaced. These lamps are conveniently of the type of telephone switchboard lamps, which are well-known, and which are set between springs of a so-called "lamp jack" well-known in the telephone art. The contact springs are indicated at 79, 79, held in place upon an insulating strip 80. In Fig. 11 the upper row of springs is shown, a similar row of springs being provided on the under side. The lamps themselves carry metallic contacts with which these contact springs make electrical engagement. The row of lamps is exposed through the opening 75 as illustrated in Fig. 9, the center lamp occupying an exactly central position, which is indicated by the center line 81 painted or otherwise marked on the celluloid 76. All the upper contact springs are connected together by a common wire 82 and the bottom contact springs are connected independently and respectively with the conductors of a cable 83. This electrical arrangement will be referred to in detail presently. The mechanism which has just been described is all inclosed by a suitable casing 84.

Figure 12:
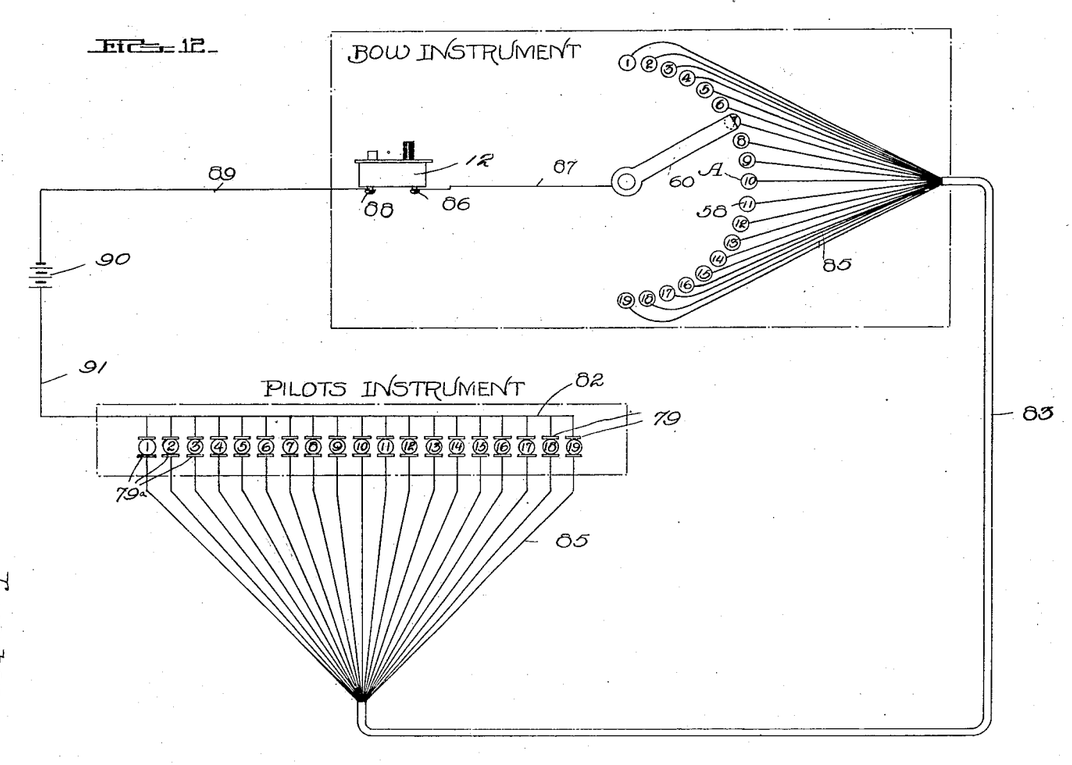
Fig. 12 is a diagrammatic view showing the electrical arrangement and circuit.

In Fig. 12 the electrical arrangement is shown and I shall now refer to that figure. So far as the actual parts of mechanism have been referred to, the same reference characters are used. The contact members 58 are connected independently and respectively to the conductors 85 of the cable 83. The brush 60 is, by its mounting, grounded to the instrument as is also the terminal 86 of the switch 12, this connection being indicated by the conductor 87 in Fig. 12. The other terminal 88 is connected by means of conductor 89 with one pole of the battery 90, the other pole of which is connected by means of a conductor 91 with the wire 82 which has already been referred to. This conductor 87 is illustrated as common to all the contact springs 79 on one side, while the contact springs 79ª are connected independently and respectively with the conductors 85 of the cable, the connections being such that #1 contact corresponds with #1 lamp, #2 contact corresponds with #2 lamp, and so on. #10 is the center lamp, as is #10 contact the center contact, this contact being the special contact A already referred to.

In the operation of the observer's instrument, it is to be noted primarily, as before stated, that the air bar 23 is mounted parallel to the keel or center line of the body. The ground speed bar 35 is to occupy a position parallel to the actual line of flight. When there is no wind, therefore, or in flying into or with the wind, the ground speed bar is parallel to the air bar. In the case of an intersecting wind when there is drift, this ground speed bar will occupy a position swung angularly to one side or the other. The swinging of this bar from one side to the other is automatically secured by rotating the compass in a manner now to be described. The crystal 53, of course, rotates with the compass casing which means that the arrow 54 rotates with the wind bar 28 about the axis of the shaft 25, the rotation of the wind-bar transmitting angular motion through the slotted bar 38, tube 34, and bracket 36 to ground speed bar 35. The result is that the ground speed bar is offset in the direction of the arrow, relative to the axis of the craft.

Let it be assumed that the aircraft is on the ground or on the water where the direction and velocity of wind may be determined by meteorological observations. The arrow 54 is set in the direction of the wind, and the screw 40 is turned until the pivot member 39 is offset to the proper extent as determined by the wind velocity scale. Thereupon, the ring 50 is loosened, and the indicating point 56 is moved angularly to a position coincident with the north arrow 55 of the compass. Thereupon the locking screw 52 is tightened. It will now appear that a definite angle between north and the wind is determined and that as the aircraft flies in one direction or another, the arrow 55 may be kept true to (that is in the direction of) the wind by rotating the compass so as to keep the indicating point 56 to the north indicating arrow 55 (this is referred to hereinafter as keeping the compass north to north). In this way the offset effected by the wind bar is always kept in the same direction as the wind. With a port beam wind, the offset will be to port. This offset is transmitted through the bar 38 to the ground speed bar, which, being on the other side of the axis of the altitude bar, about which it swings, swings to starboard, bringing the ground speed bar into position parallel with the actual line of flight over the earth. Similarly, in the case of a starboard beam wind, the offset is to the starboard, with the result that the ground speed bar is swung to port.

The device may also be set for wind with the craft in flight. This is done by setting the compass with the wind arrow 55 parallel to the air bar, pointing forwardly, and then flying with the wind, this being determined by sighting along the ground speed bar and steering the craft until no drift is perceptible. This steering is well effected by the pilot directing mechanism, the action of which will be well understood as this description proceeds. Thus is the direction of the wind determined. The ring 50 is then moved to the position wherein the indicating point 56 alines with the north arrow 55, whereupon the locking screw 52 is tightened. The pilot then flies at ninety degrees to this course, which is the direction in which maximum drift occurs. The observer, of course, swings his compass to keep "north to north" and then, while flying in this assumed direction adjusts the wind bar by manipulating the screw 40 until the ground speed bar is parallel to the line of actual flight as determined by sighting the ground along the ground speed bar. Thus the velocity of the wind is determined.

As before stated, the "dropping angle" is determined by the altitude of the plane and its ground speed. In vacuum the trajectory of the bomb would be a true parabola. In the air, however, the trajectory is modified by the resistance encountered and the dropping angle is calculated to allow for the resultant "lag". These dropping angles, thus corrected, are well known and accepted and not novel here, and it will be unnecessary for me to go into the details of their determination here. For present purposes it will suffice to point out that, as in other sights, the dropping angle is set by means of an altitude scale on a vertical axis and a speed scale on a horizontal axis. The device is set for altitude by the adjustment of the altitude bar 61, as has been described, according to the scale thereon. The calibrations of the air speed bar are calculated rearwardly of the vertical axis, the axis of the altitude bar, from a point slightly forwardly of the vertical axis, (to allow for lag), and the calibrations of the ground speed bar are similarly calculated forwardly of the vertical axis from a point equally rearwardly of the vertical axis, the units on the two bars being equal. The units on the wind bar are equal to the units on the speed bars. The underlying idea is that the bead 48 is to occupy a position on the ground speed bar equal to the setting on the air speed bar as corrected for wind.

The effective length of the air speed bar, according to setting as measured back to the axis of the compass, represents the component of motion parallel to the keel, and the effective length of the wind bar, according to setting, represents the component of motion due to the wind. The ground speed bar is the resultant, and this is so both in the matter of direction and in quantity. It will be seen that in setting the device for air speed, the movement back and forth of the compass is repeated by the bead member 47 and that the correction for wind is also transmitted to the bead member; thus the ground speed may be read from the ground speed bar 35 by the position of the bead member 47 thereon. The bead 48 is thus primarily adjusted for air speed, and then automatically corrected for ground speed and true direction, as has just been described, by the turning of the compass. When there is no wind the bead 48 is the same distance from the axis of the altitude bar as is the center of the compass. In the case of a following wind, the number of knots indicated on the wind bar added to the number of knots indicated on the air bar will equal the number of knots indicated on the ground speed bar at the position of the bead. In the case of a head wind, the number of knots indicated on the air bar minus the number of knots indicated on the wind bar will equal the number of knots indicated by the position of the bead on the ground speed bar. For an intersecting wind, corrections between these two limits are automatically made as the compass is rotated in order to keep the arrow 54 thereon at all times parallel with or in the direction of the wind. It will be noted that this correction for the longitudinal position of the bead is simultaneous with and according to the swinging correction of the ground speed bar.

Figures 3, 13:
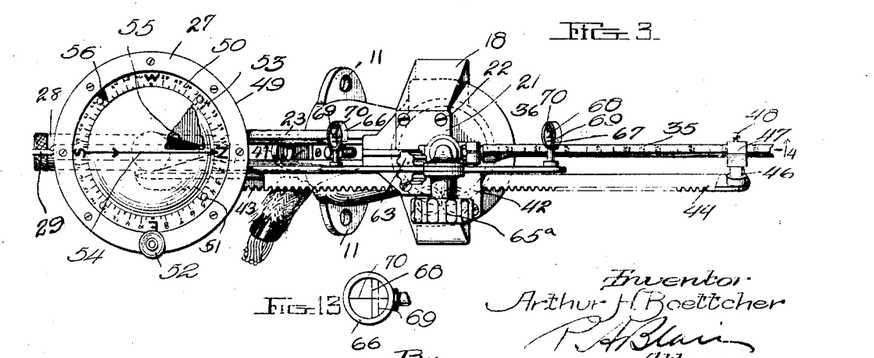
Fig. 3 is a plan view of the observer's instrument.
Fig. 13 is a detail view of one of the sight members.

It is the duty of the observer to keep the compass "north to north" and the target following sight bar 64 sighted upon a discovered target at all times. It is assumed, of course, that the craft is primarily brought into position so that the target lies within the 180 degrees ahead. Immediately upon the discovery of the target, the observer trains the sight bar 64 upon it and closes the switch 12. Immediately one lamp or two adjacent lamps in the pilot's instrument will light, indicating the position of the target relative to the line of flight. The pilot then "steers into the light" (that is he turns toward the side of the center line 81 on which the lamp is lighted) and as he does so the observer continues to keep the compass "north to north" and the sight bar sighted upon the target. This means that in the pilot's device the light will move over toward the center line. In this operation of the sight bar, the ring 66 forms the rear sight and the ring 67 forms the fore sight, the center cross hairs 68 and 70 being used for this purpose. Finally, as this action proceeds, the pilot in steering brings his craft in such a position that the target following sight bar 64 will lie parallel to the ground speed bar 35. Since the commutator swings with the ground speed bar, which may also be called the "drift" bar, and since the center contact is then engaged by the brush which swings with the sight bar, the center lamp, and the center lamp alone, is then lighted. This means that the craft is heading directly for the target. In other words, the target has been brought into the plane of actual flight and from that moment on it is a matter of keeping in that plane and approaching the target to the point of the dropping angle. As this approach proceeds, the sight bar is swung in vertical plane and finally reaches a position where it is lined up with the bead 48, at which instant the observer is advised that the dropping instant has arrived and that he must release his bomb. Under these circumstances then, the sight bar forms a double rear sight, while the bead is the front sight. In this approach, if the craft should even slightly get out of this important plane, the pilot will be so advised by the lighting of the adjoining lamp and he will immediately bring it back in again. The lighting of the adjoining lamp in addition to the center lamp indicates that the craft is just slightly off and the lighting of the adjoining lamp with the darkening of the center lamp indicates a greater error. The arrangement of parts is such that at the time when the sight bar 64 is parallel to the ground speed bar, the cross hairs 69 lie exactly in the plane of the edge of the ground speed bar, as indicated in Fig. 3, and the center cross hairs 68 lie in the parallel plane of the center of the bead 48. The advantage of this is that the observer himself may know when the sight bar is lined up properly with the ground speed bar and may sight the target as it moves relatively along the ground speed bar to the dropping point.

It is absolutely necessary to keep the device level, both fore and aft and athwartships during this sighting operation. This is made possible by the provision of the ball and socket joint 15, 17, 19. The pilot may well undertake to keep the plane within 10 degrees of horizontal and the observer may correct finally by means of this ball and socket joint, guided by the bubble in the compass. As before stated, there may be considerable friction in this joint and it is intended that this friction shall be such that the sight will remain wherever set but still be capable of ready correction by hand. The observer also having previously set his device for speed and direction of wind, must keep the compass in proper position with indicating point 56 to the north so as to keep the arrow 54 in the direction of the wind, as before stated. With his left hand he keeps the device level and the compass in proper position thus continually making the proper corrections for ground speed and drift, as described. With his right hand he operates the target following sight bar, keeping it trained on the target at all times. Since the center lamp of the pilot's device is lighted when the sight bar is parallel to the ground speed bar, no matter what the position of the ground speed bar may be, and since the ground speed bar is kept parallel to the line of actual flight, it is clear that when the center lamp lights, the pilot knows that he has the target dead ahead. The brush which operates over the commutator contacts is such that, once on the center contact, the slightest movement to one side or the other will cause the lighting of the adjoining lamp. The pilot is then advised that he is getting out of line and he immediately steers back into line, as previously pointed out in detail. Nearing the target, the observer may remove his left hand from the compass, to free it for operating the bomb release.

If the device has been set properly for wind speed and direction, the target once brought into the vertical plane of the ground speed bar can be sighted along the entire length of the ground speed bar during the approach to the point of the bead, when the dropping angle is assumed. By this means the pilot is enabled accurately to keep his craft heading directly for the target, drifting or not drifting, and the initial velocity of the bomb carried by the craft is built up accurately in the proper plane intersecting the target. The "line" of the drop being thus determined, the other accomplishment, that of release at the proper instant, is determined by the dropping angle, which has already been explained.

The important underlying thought, so far as "line" is concerned, is that one element of the communicating arrangement of the sight is dependent on the target while another element thereof is dependent on the line of actual flight, and when these two elements coincide, the pilot is so advised and knows that he is heading directly for the target, drifting or not drifting. I have illustrated and described an electrical contact brush as one of these elements, electrical contacts as the other of these elements, and electric lamps controlled thereby to convey the intelligence to the pilot. It is obvious that the broad fundamental feature of this invention may be incorporated in a mechanical indicator rather than an electrical one, and some of the appended claims are drawn of such scope as to cover either an electrical or mechanical indicator. I may state, however, that the electrical plan is preferable. The idea proceeds from the fact that the ground speed bar is kept parallel to the actual line of flight. In the present instance this is done by means of the compass correction, but it is entirely possible to keep it parallel to the actual line of flight by some other means. Similarly, the position of the bead according to the ground speed is accomplished by the compass actuation and this may be done in some other way without departing from the fundamental idea above set forth. Claims have therefore been drawn accordingly.

The idea of incorporating a level with the compass is novel and it is important in that it reduces the number of things that the observer must watch. The fact that the target following sight bar operates not only as such but also as a rear sight, also reduces the number of things the observer must watch.

Having thus described my invention, what I claim is:

1. In combination, a drift bar adapted to be set in the direction of actual flight of the aircraft over the earth, a sighting member mounted for movement in azimuth, and means operated by said sighting member for indicating the relative position of said drift bar and said sighting member.

2. In combination, a drift bar adapted to be set in the direction of actual flight of the aircraft over the earth, a sighting member mounted for movement in azimuth, an indicator, and controlling means for said indicator, said controlling means comprising an element moving with said drift bar and an element moving with said sighting member, said indicator showing the relative positions of said elements.

3. In a bomb dropping sight for aircraft, a drift bar adapted to be set in the direction of actual flight of the aircraft over the earth, a sighting member mounted for movement in azimuth, a series of semicircularly arranged electrical contacts movable with said sighting member, a contact brush moving with said sighting member and riding over said contacts, and a series of electric lamps connected respectively on one side to said contacts and on the other side through a source of current to said brush.

4. In a bomb dropping sight for aircraft, a drift bar adapted to be set in the direction of actual flight of the aicraft over the earth, said drift bar being calibrated for ground speed, a point sighting member adapted to be set on said drift bar according to ground speed, a line sighting member mounted for universal movement about a point in the axis about which said drift bar swings, and means operated by said line sighting member for indicating the relative position of said drift bar and line sighting member said line sighting member being also adapted to be alined with said point sighting member.

5. In an aircraft having an observer's cockpit in the bow and a pilot's cabin to the rear of said cockpit, a sight mounted on the bow, and comprising a drift bar adapted to be set in the direction of actual flight of the aircraft over the earth and a sighting member mounted for movement in azimuth, and means in the pilot's cabin operated by said sighting member for indicating the relative position of said drift bar and said sighting member.

6. In a bomb dropping sight for aircraft, a drift bar adapted to be set in the direction of actual flight of the aircraft over the earth, said drift bar being calibrated for ground speed, a point sighting member adapted to be set on said drift bar according to ground speed, a line sighting member mounted for universal movement about a point in the axis about which said drift bar swings and for vertical adjustment on said axis according to altitude calibrations, and means operated by said line sighting member for indicating the relative position of said drift bar and line sighting member, said line sighting member being also adapted to be alined with said point sighting member.

7. In a bomb dropping sight for aircraft, a drift bar adapted to be set in the direction of actual flight of the aircraft over the earth, said drift bar being calibrated for ground speed, a point sighting member adapted to be set on said drift bar according to ground speed, a sighting bar mounted at its middle on a point in the axis about which said drift bar swings, a sighting member at each end of said sighting bar, and means operated by said sighting bar for indicating the relative position of said drift bar and line sighting member, said sighting bar being also adapted to be alined with said point sighting member.

8. In a bomb sight, a vertical bar calibrated for altitudes and rotatable about its own axis, a line sighting member pivoted for movement on said bar, a drift bar swinging about the axis of said vertical bar, a series of electrical contacts rigidly mounted relative to said drift bar, a point sighting member adjustable on said drift bar, an electrical contact brush movable with said vertical bar and riding over said contacts, and a horizontal series of lamps connected on the one side respectively with said contacts and on the other side commonly with said brush through a switch and a source of current.

9. In a bomb sight, a vertical bar calibrated for altitudes and rotatable about its own axis, a line sighting member pivoted for movement on said bar, a drift bar swinging about the axis of said vertical bar, a series of electrical contacts rigidly mounted relative to said drift bar, a point sighting member adjustable on said drift bar, an electrical contact brush movable with said vertical bar and riding over said contacts, and a horizontal series of lamps connected on the one side respectively with said contacts and on the other side commonly with said brush through a switch and a source of current, a universal joint about which said vertical bar is adjustable, and a spirit level mounted rigidly relative to said vertical bar.

10. In combination, a bomb sight mounted upon a universal joint and having sighting points for determining a dropping angle, a compass mounted with said sight, said compass comprising a casing, convex glass top, and a card mounted in said casing in liquid, said liquid filling said casing except for a leveling bubble for coöperation with a center mark on said glass top.

11. In a bomb dropping sight for aircraft, an altitude bar, a drift bar swinging about the axis of said altitude bar, a sighting bead movable on said drift bar, a rotatable compass, a crank rotating with said compass and mechanically connected with said bead to swing said drift bar and move said bead longitudinally thereon, a sighting member mounted on said altitude bar for movement in azimuth, and means operated by said sighting member for indicating the relative position of said drift bar and said sighting member.

12. In a bomb dropping sight for aircraft, a drift bar adapted to be set in the direction of actual flight of the aircraft over the earth, a point sighting member movable on said drift bar and carrying a bead adjacent the edge of said drift bar, a sighting member mounted for universal movement about a point in the axis about which said drift bar swings, front and rear sights for said sighting member, a horizontal cross hairs and two vertical cross hairs in said sights, one of the vertical cross hairs being in the plane of the center of said bead and the other being in the plane of the edge of the drift bar when the sighting member is parallel to said drift bar, and means operating with said sighting member for indicating the relative position of said drift bar and said sighting member.

13. In combination, a bomb dropping sight comprising members adjustable relatively to each other to vary the angle between vertical and the sighting line determined by said members, one of said members being mounted to swing in a horizontal plane about the vertical through the other member as an axis.

Signed at Washington, District of Columbia, this seventh day of October, 1918.

ARTHUR H. BOETTCHER.